United States Patent [19]

May et al.

[11] Patent Number: 4,612,622
[45] Date of Patent: Sep. 16, 1986

[54] PROBE FOR COORDINATE MEASURING MACHINE

[75] Inventors: James D. May, Enfield; Charles E. Gosselin, Manchester, both of Conn.

[73] Assignee: United Technologies Corporation, Hartford, Conn.

[21] Appl. No.: 513,183

[22] Filed: Jul. 12, 1983

[51] Int. Cl.⁴ .................... G01B 5/20; G01B 7/02; G01B 7/28

[52] U.S. Cl. .................... 364/560; 33/548; 33/553; 33/174 P; 33/501

[58] Field of Search ............ 33/174 C, 174 L, 174 P; 364/560, 561, 562, 563

[56] References Cited

U.S. PATENT DOCUMENTS

| 4,118,871 | 10/1978 | Kirkham | 364/560 X |
| 4,265,022 | 5/1981 | Noguchi et al. | 33/174 P |
| 4,288,925 | 9/1981 | McMurtry | 33/174 L |
| 4,322,887 | 4/1982 | Burton | 33/174 C |
| 4,333,238 | 8/1982 | McMurtry | 33/174 L |
| 4,356,556 | 10/1982 | Sterki | 364/560 |
| 4,374,459 | 2/1983 | Burton | 33/174 C |
| 4,441,257 | 4/1984 | Golinelli et al. | 33/174 L |

Primary Examiner—Felix D. Gruber
Attorney, Agent, or Firm—Norman Friedland

[57] ABSTRACT

The spherical shaped probe for a coordinate measuring machine is modified by incorporating a pair of rods mounted in recesses formed in the center of the sphere at a side and bottom to define a straight edge whose measurement is equal to the sphere's radius measured at the tangent to the vertical and horizontal diameters. Both rods being mounted at right angles relative to each other.

5 Claims, 7 Drawing Figures

PROBE FOR COORDINATE MEASURING MACHINE

DESCRIPTION

1. Technical Field

This invention relates to instruments and particularly to measuring devices for ascertaining the area/or volume of a 3-dimensional configuration.

1. Background Art

In the design, developing and manufacturing of gas turbine engines it is important to measure the actual area or volume between adjacent vanes, fan blades, turbine buckets and the like in order to ascertain the actual amount of fluid flowing therebetween and/or to ascertain if the part meets specifications. One technique of performing such measurements is the use of a coordinate measuring machine manufactured by Digital Electronic Automation Company of Torino, Italy. For example, the model 2303, Epsilon, coordinate measuring machine is moveable in three planes (X, Y & Z) and is fully automated in response to a programmed computer. The machine is designed to establish datum points relative to a fixture with established points in the X, Y & Z axis irrespective of the location of the fixture on the working table. From the datum points the machine automatically can calculate areas, volumes and the like of the part intended to be measured.

However, one of the problems inherent in the machine is that its probe is programmed to contact specific points on the surfaces of contoured configurations and a uniform dimensional relation between the point of contact and the probe centerline must be maintained. Consequently, the machine is designed to utilize probes that are round or spherical in shape. This manifests a problem in measuring the open space between vanes in a gas turbine engine since the vanes which may be designed in clusters of two vanes per segment, have sharp or rounded edges that when in contact with the probe could present false readings as to the actual spatial distance being measured. Unless, for example, the probe touches the rounded edge at its apex and the point of the probe that is tangent to the centerline of the probe a false reading would occur and the probe would have to continually "hunt and seek" the apex or highest point and average out the value. This not only would be long and tedious but it would result in inaccuracies which could not be tolerated in this field of technology. FIG. 1 of the drawings is illustrative of the problem presented by the heretofore known probes. The spherical ball 10 at the end of the probe contacts the part being measured 12 which has a curved edge 14. The probe could contact almost any point of the curve because of the relative shapes and manifest a signal indicative of what should be the highest point of the part 12. Obviously only the center position of the three probe positions is indicative of the correct value and the positions on either the left or right as indicated will manifest an error.

We have found that by inserting a straight surface which can be a rod or bar in the verticle and horizontal plane at the center of the sphere and disposed at right angles relative to each other, and whose outer dimension is equal to the radius of the sphere we can obviate the problem noted above. This probe configuration when oriented with the component being measured merely makes a single contact with the surface being measured in order to establish the accurate value.

Furthermore the contact can be made at any point, over the extant of the verticle or horizontal bar since the probe will be at its full travel for the point of contact along the full extant of the straight line surface of the bar. Obviously, this negates the necessity of the machine to "hunt and seek" these edges since it can locate a point over a wide range of tolerances.

DISCLOSURE OF INVENTION

An object of this invention is to provide for a coordinate measuring machine an improved probe adapted to measure the actual area and/or volume of a three dimensional configuration. A feature of this invention is to dispose a pair of relatively thin rod members at right angles to each other in the center of a spherically shaped probe dimensioned so that the spherical probe radii remains constant at the vertical and horizontal quadrants.

Other features and advantages will be apparent from the specification and claims and from the accompanying drawings which illustrate an embodiment of the invention.

BRIEF DESCRIPTION OF DRAWING(S)

BEST MODE FOR CARRYING OUT THE INVENTION

Figure 2:
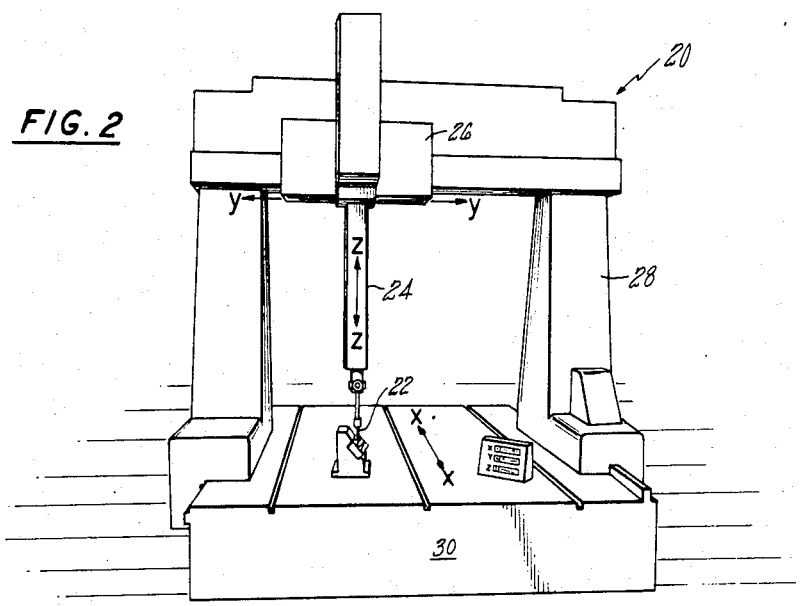
FIG. 2 is a partial view in perspective and schematic illustrating the three coordinate measuring machine.

While this invention is shown in its preferred embodiment as an instrument to measure vanes in a cluster as will be understood by those skilled in the art, this invention can be utilized to ascertain dimensions on other parts.

The three coordinate measuring machines generally indicated by reference numeral 20 are commercially available and a detailed description thereof is not necessary for an understanding of this invention. Suffice it to say that the machine is moveable in 3 planes, the horizontal front to rear or X—X axis, the horizontal side to side or Y—Y axis and the vertical up and down or Z—Z axis. Probe 22 attached to the vertical moveable support 24 moves therewith which, in turn, is carried by carriage 26 moveably affixed to the U-shaped moveable support 28 mounted in slidable relationship to table 30. Thus, as shown the U-shaped support 28 moves along the X—X axis, the carriage 26 moves along the Y—Y axis and the vertical support 24 moves along the Z—Z axis. The end of probe 22 when in contact with a surface of an object to be measured will relay an electrical signal to a special purpose computer when a slight force is exerted. By the proper contact points this measuring instrument can establish the position of the part relative to the table and given datum points of the 3 planes which are preascertained on the fixture holding the part to be measured, the probe can be programmed to automatically measure the dimensions of the part held by the fixture. It will be noted that the fixture can assume any location or orientation on the table and need not be sophisticated in design as the machine will be preprogrammed in a known manner to automatically locate the specific points on the surface of the part to be measured that the probe will contact.

As was mentioned above, heretofore the contact member of the probe was in the form of a sphere or circular shape which would exhibit a uniform dimensional relationship between the point of contact and the probe centerline. The reason for this criteria is because the program is preconditioned to compensate for this dimensional relationship. As presented, this probe contact surface was unsatisfactory for measuring the open space between vanes in a cluster of vanes.

Figure 3:
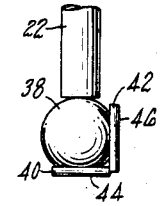
FIG. 3 is a fragmentary view of the contact portion of the probe illustrating the details of the invention.
Figure 4:
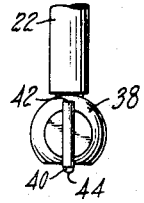
FIG. 4 is a side view of FIG. 3.
Figure 5:
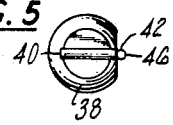
FIG. 5 is an end view of FIG. 3.
Figure 1:
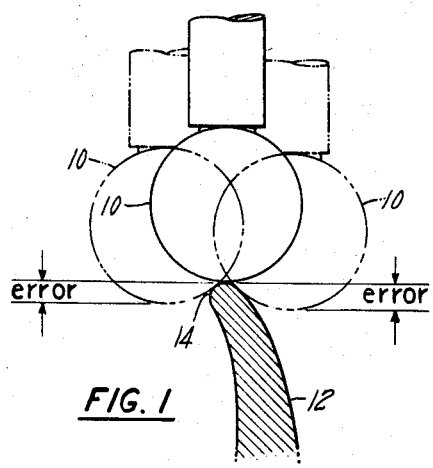
FIG. 1 is an exaggerated view of the spherical probe in contact with a component intended to be measured.

As noted from FIGS. 3, 4 and 5 the spherical contact member 38 of the probe was discretely milled to receive the rod-like members 40 and 42. The horizontal rod-like member 40 is mounted tangent to the centerline of the probe 22 and is located in the center of sphere 38. Thus, this presents a straight line contact surface 44 extending the length of rod 40. Rod 42 is mounted in the center of sphere 38 and perpendicular to rod 44. It, like rod 44, presents a vertical straight line contact surface 46 extending vertically the length of rod 42. The radii extending to surfaces 42 & 44 in the 90° and 180° quadrants is exactly the same as the 270° and 360° quadrants (see FIG. 6).

Figure 7:
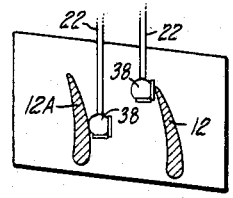
FIG. 7 is a schematic illustration of the probe in two positions in contact with vanes of a vane cluster.
Figure 6:
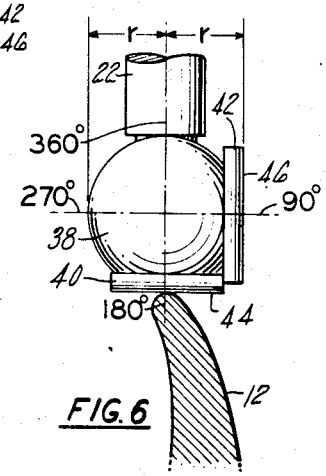
FIG. 6 is an enlarged fragmentary view of the probe in contact with a component intended to be measured.

In operation as can be seen in FIGS. 6 and 7 the surface of an edge, sharp or rounded, of a part to be measured will be contacted by the straight-edge surface of either rod 40 or 42. As seen in FIG. 6, the surface 44 of rod 40 bears against the high point of vane 12, the part being measured, and as will be appreciated, the proper value will be recorded at any point of contact along the length of rod 40. Hence, by virtue of this invention the machine will contact the same specific points of similar parts irrespective of discrepancies in the dimensions. This allows the machine to measure similar parts with a wide range of tolerances.

Obviously, the spherical surface of the probe will perform its usual function when contacting the smooth surface of the vane 12A shown in FIG. 7. In FIG. 7, as will be appreciated, the probe is programmed to contact specific points on vanes 12 and 12A so as to measure the space therebetween. As the parts intended to be measured will always be oriented in generally the same position, the straight edge portion of the contact member of the probe will always be oriented to contact specific points on the surfaces of the member being measured. Thus, if only the height of an edge is being contacted, the sphere would only need a horizontal straight line on the bottom of the sphere. Other modifications could be made without deviating from the scope of this invention.

It should be understood that the invention is not limited to the particular embodiments shown and described herein, but that various changes and modifications may be made without departing from the spirit and scope of this novel concept as defined by the following claims.

What is claimed:

1. A probe for a coordinate measuring machine that takes measurements in three dimensions and responds to computer calculated signals, the contact portion of said probe being generally spherically shaped, the improvement comprising an elongated bar-like element mounted in a vertical recess formed in the center of said generally spherically shaped member and the transverse dimension of said bar-like member being such that its outer surface lies tangent to the outer removed surface of the generally spherically shaped member at the 90° quadrant relative to the vertical axis of the generally spherically shaped member.

2. A probe as in claim 1 including another bar-like element mounted in a horizontal recess formed in the center of said generally spherically shaped member and the transverse dimension of said bar-like member being such that its outer surface lies tangent to the outer removed surface of the generally spherically shaped member at the 180° quadrant relative to the vertical axis of the generally spherically shaped member.

3. A probe as in claim 1 or 2 wherein said bar-like elongated member is an elongated rod extending almost the length equal to the diameter of said generally spherically shaped member.

4. A probe for a coordinate measuring machine that takes measurements in three dimensions and responds to computer calculated signals, the contact portion of said probe being generally spherically shaped, the improvement comprising an elongated bar-like element mounted in a vertical recess formed in the center of said generally spherically shaped member and the transverse dimension of said bar-like member being such that its outer surface lies tangent to the outer removed surface of the generally spherically shaped member at the 90° quadrant relative to the vertical axis of the generally spherically shaped member, another bar-like element mounted in a horizontal recess formed in the center of said generally spherically shaped member and the transverse dimension of said bar-like member being such that its outer surface lies tangent to the outer removed surface of the generally spherically shaped member at the 180° quadrant relative to the vertical axis of the generally spherically shaped member, and being perpendicular to said bar-like member.

5. A probe as in claim 4 wherein said bar-like elongated member is an elongated rod extending almost the length equal to the diameter of said generally spherically shaped member and said other bar-like elongated is another elongated rod extending almost the length equal to the diameter of said generally spherically shaped member.

* * * * *